Patented Jan. 31, 1933

1,895,515

UNITED STATES PATENT OFFICE

WILBUR A. LAZIER, OF WILMINGTON, DELAWARE, ASSIGNOR TO E. I. DU PONT DE NEMOURS & COMPANY, OF WILMINGTON, DELAWARE, A CORPORATION OF DELAWARE

CATALYTIC HYDROGENATION PROCESS

No Drawing.   Application filed May 18, 1928.  Serial No. 278,910.

This invention relates to catalytic processes of hydrogenation of organic compounds wherein a metal oxide catalyst is used together with a substance which has the effect of repressing undesirable side and secondary reactions.

In the field of organic chemistry the production of numerous important compounds depends upon the ease and completeness with which hydrogen may be attached to more available or less costly compounds than the products of such attachment. Such reactions are conveniently termed hydrogenations and constitute one of the more important classes of organic reactions. A very important and familiar use of hydrogenation is in the formation of alcohols by the hydrogenation of aldehydes or ketones. For instance, under proper conditions a ketone may be hydrogenated to produce the corresponding alcohol, but subsequent dehydration of this product to an olefin usually deprives the process of commercial success, particularly if a metallic oxide catalyst is employed. In a similar manner, aldehyde alcohols which are capable of hydrogenation to glycols are partially destroyed by dehydration during the hydrogenation process.

It is well known that in order to bring about a practical speed of hydrogenation, the process must be conducted at elevated temperatures with the result that the reactions are often carried out in the vapor phase. The use of certain catalysts or coarse inorganic solids possessing extensive surfaces also greatly facilitates the reactions. Since most catalytic masses are not strictly specific in their action, the conditions necessary for operation usually bring about undesired side reactions.

It is particularly difficult to select contact materials which will bring about a hydrogenation without some destructive action on the initial material or reaction product since the greater number of catalytic materials are more or less mixed in their behavior. In many cases, it has been found that the so-called "pure" catalysts possess comparatively inferior catalytic activity or have other objections. Certain reduced metals such as copper, iron or nickel are useful as hydrogenation catalysts but their action is often too vigorous causing breaking down of the products of reaction. Other disadvantages of these metallic catalysts are their extreme sensitivity to catalyst poisons, particularly sulfur compounds, and their tendency to sinter, i. e., to deteriorate under the influence of high temperature.

It is known that certain non-reducible or slowly reducible oxides, either alone or combined with other substances having promoter action, are catalysts suitable for use in hydrogenation processes under proper conditions of temperature and pressure. These non-reducible or slowly reducible oxides are termed "difficultly reducible oxides" for purposes of simplicity.

Most oxide catalysts that can be used for the hydrogenation of oxygenated organic compounds, do not have a single effect, that is, they do not cause the reaction to proceed entirely in the desired direction but give rise to a mixed hydrogenation and dehydration, with the result that secondary and side reactions are set up which destroy the more desirable products which are formed in the hydrogenation reactions or may even destroy the starting material if it is capable of dehydration. Among such oxide catalysts may be named the following:—the oxides of beryllium, magnesium, zinc, aluminum, silicon, titanium, germanium, zirconium, tin, cerium, thorium, vanadium, bismuth, chromium, molybdenum, tungsten, uranium, manganese, iron, or any of the rare earths, etc. Some of these catalysts are more efficacious than others, but all possess some activity and each oxide has its own peculiar normal effect in the reaction as regards the relative proportions or moles of hydrogenated and dehydrated product produced.

According to the present invention the character of oxide catalysts may be profoundly altered by the addition of small amounts of substances which of themselves may have little or no effect on the main reaction, but which substances have a marked influence upon the undesirable side reactions and secondary reactions.

The following examples will illustrate the specific application of the invention:—

*Example 1.*—One hundred cc. of a contact mass consisting principally of zinc chromite prepared by the gentle ignition of basic zinc ammonium chromate but containing about 10% of potassium carbonate, is charged into a suitable copper lined, pressure resisting tube. Acetone is pumped at the rate of about 1.5 liters per hour through a heated vaporizer tube against the pressure of a supply of compressed hydrogen, and the acetone vapor-hydrogen mixture maintained at a pressure of 200 atmospheres is passed over the catalyst heated to about 375° C. at such a rate that the effluent gas after condensing the liquid products leaves the catalyst chamber at the rate of about 1,000 liters per hour as measured at ordinary temperature and pressure. Under these conditions the effluent gas contains no propylene and the condensate contains about 10% isopropyl alcohol, the remainder being unchanged acetone.

As illustrating the effect of the alkali in suppressing the dehydration of the isopropyl alcohol formed in the described example, when a similar catalyst not containing alkali is used under the same conditions, hydrogenation proceeds at about the same rate but the exit gas contains 5.5% propylene and the recovery of liquid products is correspondingly low.

The following is an example of a hydrogenation process in which the dehydration may take place in both the primary reaction and in a secondary reaction, that is the reactant material and the product of the reaction are both capable of dehydration. Specifically, in the hydrogenation of acetaldol to form methyl-trimethylene glycol, both the acetaldol and the methyl-trimethylene glycol are subject to dehydration, and the process of the invention is applied to repress both of these undesirable dehydration reactions:—

*Example 2.*—Hydrogen gas is allowed to bubble through a heated vessel containing acetaldol under a pressure of 150 atmospheres. The vapor-laden gas, while still under pressure, is then conducted at 350° C. over a catalyst prepared by precipitating zinc carbonate with a strong solution of sodium or potassium carbonate, drying the precipitate without washing, and heating to drive off the carbon dioxide, care being taken to avoid the presence of such stable acid ions as sulphates, phosphates, and the like. The catalyst so prepared contains a substantial quantity of alkali carbonate which serves to prevent the dehydration of either the acetaldol or of the methyl-trimethylene glycol formed by hydrogenation.

In general, the characteristics of the oxide catalysts can be changed and controlled by the addition to the catalyst of another substance that may itself have no effect on the reaction, but which, nevertheless, will exert a very profound effect on the catalyst, causing it to act selectively so as to repress or suppress the dehydrating reaction taking place. This repression of dehydration was hitherto unrecognized in the art so that there not only was no possible control of such reactions in the desired direction, but there was also no practical means of utilizing any desired oxide catalysts for a particular reaction.

Such oxide catalysts as enumerated above may be treated with a compound of one of the alkali or alkali earth metals of groups 1 and 2 of the periodic table, either in the form of their oxides, carbonates, hydroxides, or salts with feeble acids, such as organic acids, etc., for the purpose of repressing the dehydration and thereby making the process more entirely one of hydrogenation. In particular cases the effect will be almost, if not entirely, total, depending on the nature of the catalyst and the represser and the quantity thereof employed, which will vary in particular cases but which is rarely critical as regards quantity. In practice, the required repressive substance may be incorporated into the contact mass by co-precipitation, occlusion during precipitation, impregnation, grinding, or in any other way as by dry grinding the repressive material into the catalyst.

By the use of the terms repressive agents and suppressive agents I refer to the ultimate or final effects of these added substances and not to any theory or mechanism of operation, or to any explanation of the ionic, molecular, or atomic relationships or groupings on the surfaces of the catalyst, which may or may not favor preferential, selective, or other action whose ultimate effect is the repression referred to. I accordingly designate those substances having such repressive or suppressive effects by the general term repressers or repressives, indicating thereby that the action may be either partial or complete in eliminating the dehydrating effects, while I indicate by the term suppresser or suppressive a substantially total repressive effect. These repressers are neither to be considered components nor constituents of mixed catalysts, nor are they to be considered promoters or activators although these additional attributes may, in special cases, also be present incidentally.

As many apparently widely different embodiments of this invention may be made without departing from the spirit and scope thereof, it is to be understood that I do not limit myself to the specific embodiments thereof except as defined in the appended claims.

I claim:

1. The catalytic process of preparing an alcohol which comprises hydrogenating a ketone in the presence of a difficultly reducible oxide catalyst that has both a hydrogenating and a dehydrating effect, the catalyst having mixed therewith a basic compound of an alkali forming metal, to repress the normal dehydrating effect of said catalyst, said alcohol having the same number of carbon atoms as said ketone.

2. The process of claim 1 in which the catalyst is zinc oxide.

3. The catalytic process of preparing an alcohol which comprises hydrogenating a ketone in the presence of a zinc oxide catalyst having mixed therewith an alkaline compound of an alkali metal, said alcohol having the same number of carbon atoms as said ketone.

4. The process of claim 1 in which the ketone is acetone.

5. The catalytic process of preparing isopropyl alcohol which comprises hydrogenating acetone in the presence of a zinc oxide catalyst having mixed therewith an alkaline compound of an alkali metal.

6. The catalytic process of preparing an alcohol which comprises reacting a mixture consisting of hydrogen and a compound taken from the group consisting of aldehydes and ketones having at least two adjoining carbon atoms, in the presence of a catalyst having both a hydrogenating and a dehydrating effect, the catalyst having admixed therewith a basic compound of an alkali-forming metal to repress the normal dehydrating effect of said catalyst, said alcohol having the same number of carbon atoms as the compound hydrogenated.

7. The process described in claim 6 in which the alkali-forming metal is an alkali metal.

In testimony whereof, I affix my signature.

WILBUR A. LAZIER.